(12) United States Patent
Hashimoto

(10) Patent No.: US 12,017,712 B2
(45) Date of Patent: Jun. 25, 2024

(54) TRAVEL CONTROL DEVICE FOR VEHICLE

(71) Applicant: ADVICS CO., LTD., Kariya (JP)

(72) Inventor: Yosuke Hashimoto, Kariya (JP)

(73) Assignee: ADVICS CO., LTD., Kariya (JP)

( * ) Notice: Subject to any disclaimer, the term of this patent is extended or adjusted under 35 U.S.C. 154(b) by 337 days.

(21) Appl. No.: 17/436,842

(22) PCT Filed: Mar. 3, 2020

(86) PCT No.: PCT/JP2020/008884
§ 371 (c)(1),
(2) Date: Sep. 7, 2021

(87) PCT Pub. No.: WO2020/195604
PCT Pub. Date: Oct. 1, 2020

(65) Prior Publication Data
US 2022/0177030 A1    Jun. 9, 2022

(30) Foreign Application Priority Data

Mar. 25, 2019   (JP) ................. 2019-056649

(51) Int. Cl.
*B62D 6/00*    (2006.01)
*B60W 10/18*   (2012.01)
(Continued)

(52) U.S. Cl.
CPC .............. *B62D 6/00* (2013.01); *B60W 10/18* (2013.01); *B60W 10/20* (2013.01); *B62D 7/14* (2013.01)

(58) Field of Classification Search
CPC .......... B62D 6/00; B62D 7/14; B60W 10/18; B60W 10/20
See application file for complete search history.

(56) References Cited

U.S. PATENT DOCUMENTS 5,508,921 A * 4/1996 Chikuma ............. B62D 7/1581
701/41
6,050,359 A * 4/2000 Mouri ..................... B62D 6/00
180/168
(Continued)

FOREIGN PATENT DOCUMENTS

JP   2012006506 A   1/2012

OTHER PUBLICATIONS

International Search Report (PCT/ISA/210) with translation and Written Opinion (PCT/ISA/237) dated May 26, 2020, by the Japanese Patent Office as the International Searching Authority for International Application No. PCT/JP2020/008884. (8 pages).

*Primary Examiner* — Jaime Figueroa
*Assistant Examiner* — Mohamad O El Sayah
(74) *Attorney, Agent, or Firm* — BUCHANAN INGERSOLL & ROONEY PC

(57) ABSTRACT

A travel control device includes a turning control unit configured to execute turning support control causing a turning state quantity to follow a target turning state quantity by causing at least one of a front wheel steered angle adjustment device, a rear wheel steered angle adjustment device, and a braking device to be driven, and a steering instruction unit configured to, when steering is not being performed during the execution of turning support control, derive a holding torque and instruct a steering device to apply the holding torque to a steering wheel. The turning control unit causes the rear wheel steered angle adjustment device and/or the braking device to be driven but causes the front wheel steered angle adjustment device not to be driven when steering is not being performed. The turning control unit causes the front wheel steered angle adjustment device to be driven when steering is being performed.

6 Claims, 3 Drawing Sheets

(51) Int. Cl.
    *B60W 10/20*    (2006.01)
    *B62D 7/14*    (2006.01)

(56) References Cited

U.S. PATENT DOCUMENTS

| | | | |
|---|---|---|---|
| 11,591,015 B2* | 2/2023 | Eilers | B62D 15/0235 |
| 2006/0142921 A1* | 6/2006 | Takeda | B60W 30/12 |
| | | | 701/70 |
| 2012/0226417 A1* | 9/2012 | Nishikawa | B60W 30/12 |
| | | | 701/41 |
| 2013/0190988 A1 | 7/2013 | Limpibunterng et al. | |
| 2013/0253770 A1* | 9/2013 | Nishikawa | B60W 10/18 |
| | | | 701/1 |
| 2014/0229068 A1* | 8/2014 | Ueyama | B60W 10/20 |
| | | | 701/41 |
| 2015/0151778 A1* | 6/2015 | Kageyama | B62D 5/006 |
| | | | 701/41 |
| 2017/0361872 A1* | 12/2017 | Gupta | B62D 15/025 |
| 2018/0099690 A1* | 4/2018 | Oya | B62D 5/0463 |
| 2018/0201317 A1* | 7/2018 | Kudo | B60W 10/20 |
| 2020/0180693 A1* | 6/2020 | Suzuki | B60R 11/04 |
| 2021/0214001 A1* | 7/2021 | Solomon | B62D 7/159 |

\* cited by examiner

TRAVEL CONTROL DEVICE FOR VEHICLE

TECHNICAL FIELD

The present disclosure relates to a travel control device for a vehicle.

BACKGROUND ART

PTL 1 describes an example of a travel control device that performs turning support control for supporting turning of a vehicle travelling in a travel lane. In this travel control device, when the vehicle is turned in a situation in which a driver is not steering, the vehicle is turned by automatically adjusting a steered angle of front wheels connected to a steering device.

CITATION LIST

Patent Literature

PTL 1: JP-A-2012-6506

SUMMARY

Technical Problem

When the vehicle is automatically turned by performing the turning support control, it is conceivable to hold a steering angle of a steering wheel at a neutral point. The neutral point is a steering angle when the steered angle of the front wheels is "0 (zero)". When the steering angle is held at the neutral point, a holding torque, which is a torque for holding the steering angle at the neutral point, is applied to the steering wheel by driving the steering device.

A magnitude of the holding torque varies depending on a vehicle body slip angle of the vehicle and the steered angle of the front wheels. Therefore, it is necessary to sequentially update the holding torque in accordance with changes in the vehicle body slip angle and the steered angle of the front wheels. In this case, a first torque, which is a component corresponding to the vehicle body slip angle, and a second torque, which is a component corresponding to the steered angle of the front wheels, are individually derived from the holding torque. When the first torque and the second torque are derived in this way, a calculation load of the travel control device increases.

Solution to Problem

A travel control device for a vehicle for solving the above problems is applied to a vehicle including a front wheel steered angle adjustment device that is configured to control a turning state quantity, which is a state quantity related to turning of the vehicle, through adjustment of a steered angle of a front wheel, a turning control device that is provided separately from the front wheel steered angle adjustment device and configured to control the turning state quantity, and a steering device that includes a steering wheel to which a steering torque is input and is connected to the front wheel. The travel control device includes: a turning control unit configured to execute turning support control of causing the turning state quantity to follow a target turning state quantity, which is a target of the turning state quantity, by causing at least one of the front wheel steered angle adjustment device and the turning control device to be driven; and a steering instruction unit configured to, when steering is not being performed during the execution of the turning support control, derive a holding torque, which is a torque at which a steering angle of the steering wheel is held at a neutral point, and instruct the steering device to apply the holding torque to the steering wheel. Further, the turning control unit causes the turning control device to be driven and causes the front wheel steered angle adjustment device not to be driven in the turning support control when the steering is not being performed, and causes the front wheel steered angle adjustment device to be driven in the turning support control when the steering is being performed.

According to the above configuration, when the steering is not being performed during the execution of the turning support control, the front wheel steered angle adjustment device is not driven, and therefore the steered angle of the front wheel is maintained at "0 (zero)". Therefore, when the holding torque is derived, it is necessary to derive a torque component corresponding to a vehicle body slip angle, and it is not necessary to derive a torque component corresponding to the front wheel steered angle. Therefore, since it is not necessary to derive the torque component corresponding to the steered angle of the front wheel, the steering angle of the steering wheel can be maintained at the neutral point while reducing an increase in a calculation load of the travel control device.

DESCRIPTION OF EMBODIMENTS

Hereinafter, an embodiment of a travel control device for a vehicle will be described with reference to FIGS. 1 to 4.

Figure 1:
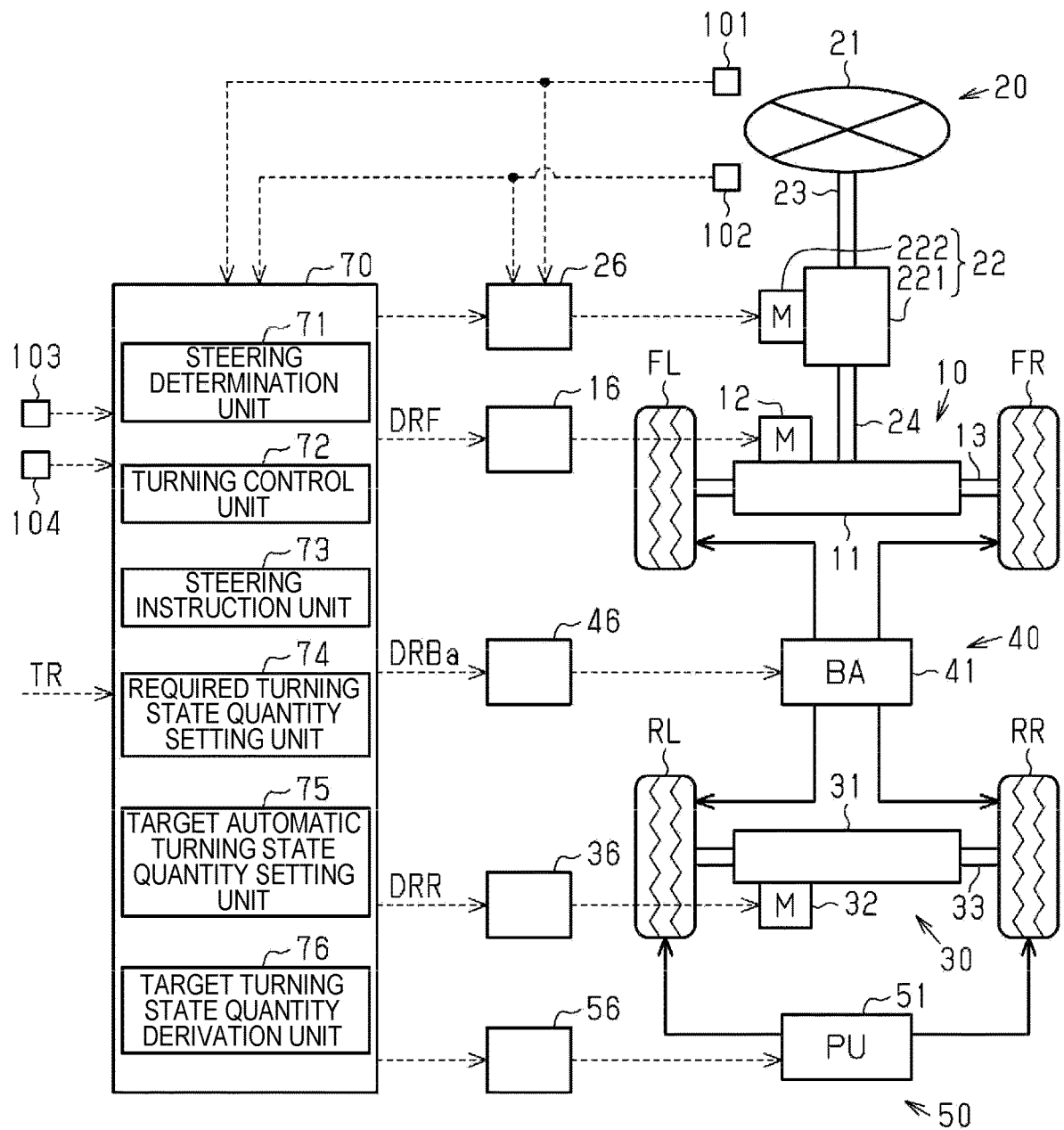
FIG. 1 is a diagram illustrating a functional configuration of a travel control device for a vehicle according to an embodiment and a schematic configuration of a vehicle including the travel control device.

FIG. 1 schematically illustrates a vehicle including a travel control device 70 according to the present embodiment. The vehicle includes a front wheel steered angle adjustment device 10 that adjusts a steered angle $\theta F$ of a plurality of front wheels FL and FR, a steering device 20 connected to each of the front wheels FL and FR, and a rear wheel steered angle adjustment device 30 that adjusts a steered angle $\theta R$ of a plurality of rear wheels RL and RR. The steered angle $\theta F$ of the front wheels FL and FR is referred to as a "front wheel steered angle SF", and the steered angle $\theta R$ of the rear wheels RL and RR is referred to as a "rear wheel steered angle $\theta R$". Further, the vehicle includes a braking device 40 that adjusts a braking force of the vehicle, and a driving device 50 that adjusts a driving force of the vehicle.

The front wheel steered angle adjustment device 10 includes a front wheel steered actuator 11 and a front wheel steered control unit 16 that controls the front wheel steered actuator 11. The front wheel steered actuator 11 is connected to each of the front wheels FL and FR via a tie rod 13. The front wheel steered actuator 11 is provided with a front wheel motor 12 as a power source, and the front wheel motor 12 is controlled by the front wheel steered control unit 16.

Further, the front wheel steered angle adjustment device 10 adjusts the front wheel steered angle θF by transmitting a driving torque of the front wheel motor 12 to each of the front wheels FL and FR via the tie rod 13.

The steering device 20 includes a steering wheel 21, a steering actuator 22, and a steering control unit 26 that controls the steering actuator 22. Since the steering wheel 21 is operated by a driver, a steering torque TQIn caused by steering is input to the steering wheel 21. The steering actuator 22 is connected to the steering wheel 21 via a steering shaft 23, and is connected to the front wheel steered actuator 11 via an intermediate shaft 24. That is, the steering actuator 22 is connected to each of the front wheels FL and FR via the intermediate shaft 24, the front wheel steered actuator 11, and the tie rod 13.

When the front wheels FL and FR are steered by the steering, the steering torque TQIn input to the steering wheel 21 by the driver is input to the front wheel steered actuator 11 via the steering actuator 22. Accordingly, the front wheel steered angle θF is changed in accordance with a change in a steering angle of the steering wheel 21. That is, when the steering is performed, there is a correlation between an actual steering angle Str and the front wheel steered angle θF. The steering angle Str correlated with the front wheel steered angle θF is referred to as a "reference steering angle StrB". Further, when the front wheels FL and FR are steered by the steering, the actual steering angle Str substantially coincides with the reference steering angle StrB at this time. The reference steering angle StrB at which the front wheel steered angle θF is "0 (zero)" is referred to as a "neutral point StrC".

The steering actuator 22 includes an operating angle control mechanism 221 that adjusts a difference between the actual steering angle Str and the reference steering angle StrB, and a steering motor 222 that is a power source of the operating angle control mechanism 221. By controlling an operation of the operating angle control mechanism 221 by the steering control unit 26, the difference between the steering angle Str and the reference steering angle StrB can be generated. When the front wheels FL and FR are steered by the steering, the operating angle control mechanism 221 is operated such that the difference is "0 (zero)". Accordingly, the actual steering angle Str substantially coincides with the reference steering angle StrB at this time.

Further, the steering device 20 is provided with a steering angle sensor 101 that detects the steering angle Str and a torque sensor 102 that detects the steering torque TQIn input to the steering wheel 21 by the steering. The steering angle sensor 101 outputs a signal corresponding to the steering angle Str to the steering control unit 26 and the travel control device 70 as a detection signal. The torque sensor 102 outputs a signal corresponding to the steering torque TQIn to the steering control unit 26 and the travel control device 70 as the detection signal.

The rear wheel steered angle adjustment device 30 includes a rear wheel steered actuator 31 and a rear wheel steered control unit 36 that controls the rear wheel steered actuator 31. The rear wheel steered actuator 31 is connected to each of the rear wheels RL and RR via a tie rod 33. The rear wheel steered actuator 31 is provided with a rear wheel motor 32 as the power source, and the rear wheel motor 32 is controlled by the rear wheel steered control unit 36. Further, the rear wheel steered angle adjustment device 30 adjusts the rear wheel steered angle θR by transmitting a driving torque of the rear wheel motor 32 to each of the rear wheels RL and RR via the tie rod 33. When the rear wheel steered angle θR is changed while the vehicle is travelling in this way, a magnitude of a yaw moment of the vehicle changes. When the magnitude of the yaw moment changes, a turning state quantity such as a yaw rate Yr and a lateral acceleration Gy of the vehicle changes. The turning state quantity is a state quantity related to the turning of the vehicle. Therefore, in the present embodiment, the rear wheel steered angle adjustment device 30 is an example of the "turning control device".

The braking device 40 includes a braking actuator 41 and a braking control unit 46 that controls the braking actuator 41. The braking actuator 41 can individually adjust a braking force of each of the wheels FL, FR, RL, and RR. When the vehicle is travelling, the yaw moment can be generated in the vehicle by generating a braking force difference between the right front wheel FR and the left front wheel FL, that is, the turning state quantity can be varied. Therefore, in the present embodiment, the braking device 40 is also an example of the "turning control device".

The driving device 50 includes a power unit 51 and a driving control unit 56 that controls the power unit 51. The power unit 51 is provided with a power source of the vehicle such as an engine or an electric motor. In an example illustrated in FIG. 1, since the rear wheels RL and RR are driving wheels, a driving torque output from the driving device 50 is input to the each of the rear wheels RL and RR.

The travel control device 70 supports automatic travelling of the vehicle along a set travel route TR by driving various in-vehicle devices. In the present embodiment, for example, information on the travel route TR for causing the vehicle to travel along the travel lane is input from another device to the travel control device 70.

The travel control device 70 includes, as functional units for supporting the turning of the vehicle, a steering determination unit 71, a turning control unit 72, a steering instruction unit 73, a required turning state quantity setting unit 74, a target automatic turning state quantity setting unit 75, and a target turning state quantity derivation unit 76.

The steering determination unit 71 determines whether the driver is steering. For example, the steering determination unit 71 determines whether the steering is being performed using the steering torque TQIn derived based on the detection signal from the torque sensor 102. Processing of determining whether the steering is being performed will be described later.

The turning control unit 72 executes the turning support control of causing a turning state quantity TSQ to follow a target turning state quantity TSQTr, which is a target of the turning state quantity TSQ, by causing at least one of the front wheel steered angle adjustment device 10, the rear wheel steered angle adjustment device 30, and the braking device 40 to be driven. The turning state quantity TSQ is a state quantity capable of generating a larger yaw moment as a value thereof is larger. Examples of the turning state quantity TSQ include the yaw rate Yr of the vehicle derived based on a detection signal from a yaw rate sensor 103 and the lateral acceleration Gy of the vehicle derived based on a detection signal from a lateral acceleration sensor 104.

When the steering determination unit 71 determines that the steering is being performed, the turning control unit 72 executes steering-being-performed turning support control as the turning support control when the steering is being performed. On the other hand, when the steering determination unit 71 determines that the steering is not being performed, the turning control unit 72 executes steering-not-being-performed turning support control as the turning support control when the steering is not being performed. In the steering-being-performed turning support control, the turning control unit 72 causes the front wheel steered angle adjustment device 10 to be driven and causes at least one of the rear wheel steered angle adjustment device 30 and the braking device 40 to be driven. On the other hand, in the steering-not-being-performed turning support control, the turning control unit 72 causes at least one of the rear wheel steered angle adjustment device 30 and the braking device 40 to be driven, but causes the front wheel steered angle adjustment device 10 not to be driven.

When the steering-being-performed turning support control is being executed, the front wheel steered control unit 16 controls the front wheel steered actuator 11 to vary the front wheel steered angle θF. On the other hand, when the steering-not-being-performed turning support control is being performed, since a drive instruction is not input to the front wheel steered angle adjustment device 10, the front wheel steered control unit 16 controls the front wheel steered actuator 11 such that the front wheel steered angle θF is "0 (zero)". That is, causing the front wheel steered angle adjustment device 10 not to be driven during the execution of the steering-being-performed turning support control means maintaining the front wheel steered angle θF at "0 (zero)".

When the turning control unit 72 is instructed to drive the rear wheel steered angle adjustment device 30 in a situation in which the turning support control is being executed, the rear wheel steered control unit 36 controls the rear wheel steered actuator 31 to vary the rear wheel steered angle θR. On the other hand, when the turning control unit 72 is instructed not to drive the rear wheel steered angle adjustment device 30 in the situation in which the turning support control is being executed, the rear wheel steered control unit 36 controls the rear wheel steered actuator 31 such that the rear wheel steered angle θR is maintained at "0". That is, driving the rear wheel steered angle adjustment device 30 in the turning support control means turning the vehicle by adjusting the rear wheel steered angle θR. On the other hand, not driving the rear wheel steered angle adjustment device 30 in the turning support control means maintaining the rear wheel steered angle θR at "0 (zero)".

When the turning control unit 72 is instructed to drive the braking device 40 in the situation in which the turning support control is being executed, the braking control unit 46 controls the braking actuator 41 such that the braking force difference is generated between the right front wheel FR and the left front wheel FL. On the other hand, when the turning control unit 72 is instructed not to drive the braking device 40 in the situation in which the turning support control is being executed, the braking control unit 46 does not generate the braking force difference between the right front wheel FR and the left front wheel FL. That is, driving the braking device 40 in the turning support control means turning the vehicle by adjusting the braking force difference between the right wheel and the left wheel. On the other hand, not driving the braking device 40 in the turning support control means maintaining the braking force difference at "0 (zero)".

When the braking force is applied to at least one of the right front wheel FR and the left front wheel FL by the driving of the braking device 40, the vehicle may decelerate. Therefore, when the braking device 40 is driven by executing the turning support control, the turning control unit 72 may instruct the driving control unit 56 to increase the driving force of the vehicle so as to cancel the deceleration of the vehicle caused by the application of the braking force to at least one of the right front wheel FR and the left front wheel FL. In this case, when the instruction is input, the driving control unit 56 controls the power unit 51 such that the driving force of the vehicle is increased by a quantity corresponding to the instruction.

The steering instruction unit 73 controls the steering device 20 when the turning support control is executed by the turning control unit 72. That is, when the steering-not-being-performed turning support control is executed, the steering instruction unit 73 instructs the steering device 20 to maintain the steering angle at the neutral point StrC. On the other hand, when the steering-being-performed turning support control is executed, the steering instruction unit 73 instructs the steering device 20 to assist the steering of the driver. A processing content of the steering instruction unit 73 when the steering-not-being-performed turning support control is executed and the processing content of the steering instruction unit 73 when the steering-being-performed turning support control is executed will be described later.

The required turning state quantity setting unit 74 acquires a steering-related value related to the steering, and sets a value corresponding to a steering-related value as a required turning state quantity which is a required value of the turning state quantity. Examples of the steering-related value include the steering angle Str and the steering torque TQIn. For example, when the steering angle Str is set as the steering-related value, the required turning state quantity setting unit 74 sets a required turning state quantity TSQR such that the value of the required turning state quantity TSQR increases as the steering angle Str increases. When the steering determination unit 71 determines that the steering is not being performed, the required turning state quantity setting unit 74 makes the required turning state quantity TSQR equal to "0 (zero)". When the turning state quantity TSQ is the yaw rate Yr of the vehicle, the yaw rate Yr corresponding to the steering-related value is set as the required turning state quantity TSQR.

The target automatic turning state quantity setting unit 75 sets a target automatic turning state quantity TSQATr that is a target of the turning state quantity for turning the vehicle along the set travel route TR. For example, the target automatic turning state quantity setting unit 75 sets the target automatic turning state quantity TSQATr such that a value of the target automatic turning state quantity TSQATr increases as a turning radius of the travel route TR decreases. When the turning state quantity TSQ is the yaw rate Yr of the vehicle, the yaw rate Yr corresponding to the turning radius of the travel route TR and a vehicle body speed of the vehicle is set as the target automatic turning state quantity TSQATr.

The target turning state quantity derivation unit 76 derives the target turning state quantity TSQTr. That is, when the steering determination unit 71 determines that the steering is not being performed, the target turning state quantity derivation unit 76 sets the target automatic turning state quantity TSQATr as the target turning state quantity TSQTr. On the other hand, when the steering determination unit 71 determines that the steering is being performed, the target turning state quantity derivation unit 76 derives the target turning state quantity TSQTr based on a parameter having a larger absolute value of the required turning state quantity TSQR and the target automatic turning state quantity TSQATr. Specifically, the target turning state quantity derivation unit 76 derives the target turning state quantity TSQTr such that a value of the target turning state quantity TSQTr increases as the parameter increases. For example, the target turning state quantity derivation unit 76 sets the parameter having the larger absolute value of the required turning state quantity TSQR and the target automatic turning state quantity TSQATr as the target turning state quantity TSQTr.

Further, the target turning state quantity derivation unit 76 also derives a target vehicle body slip angle βTr that is a target of a vehicle body slip angle. For example, the target turning state quantity derivation unit 76 derives the target vehicle body slip angle βTr based on the derived target turning state quantity TSQTr.

Figure 2:
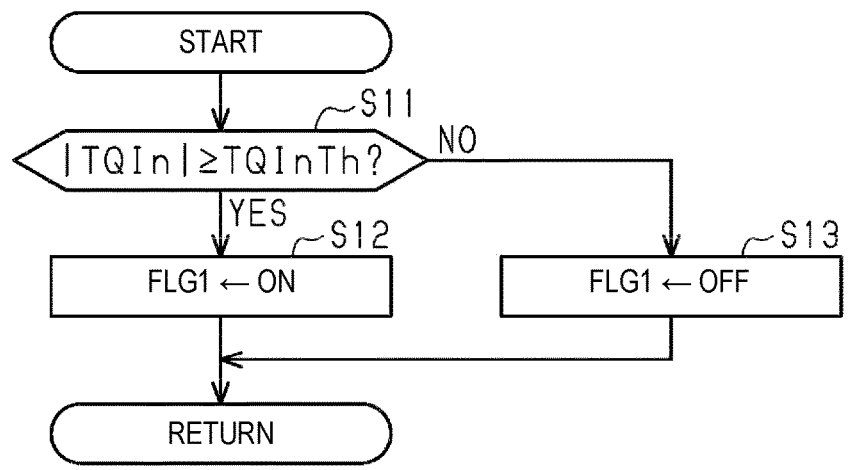
FIG. 2 is a flowchart illustrating a processing routine executed when it is determined whether steering is being performed.

Next, a processing routine executed by the steering determination unit 71 to determine whether the steering is being performed will be described with reference to FIG. 2. The present processing routine is repeatedly executed for each predetermined control cycle when the turning support control is executed.

In the present processing routine, in step S11, it is determined whether an absolute value of the steering torque TQIn is equal to or greater than that of a determination steering torque TQInTh. The determination steering torque TQInTh is a criterion for determining whether the driver has an intention to rotate the steering wheel 21. When the absolute value of the steering torque |TQIn| is equal to or greater than that of the determination steering torque TQInTh, the steering is performed.

When the absolute value of the steering torque |TQIn| is equal to or greater than that of the determination steering torque TQInTh (S11: YES), the processing proceeds to a next step S12. In step S12, a steering override flag FLG1 is set to ON. The steering override flag FLG1 is a flag that is set to ON when the steering is being performed during the execution of the turning support control, and is set to OFF when the steering is not being performed during the execution of the turning support control. Then, the present processing routine is temporarily ended. On the other hand, in step S11, when the absolute value of the steering torque |TQIn| is less than that of the determination steering torque TQInTh (NO), the processing proceeds to a next step S13. In step S13, the steering override flag FLG1 is set to OFF. Thereafter, the present processing routine is temporarily ended.

Figure 3:
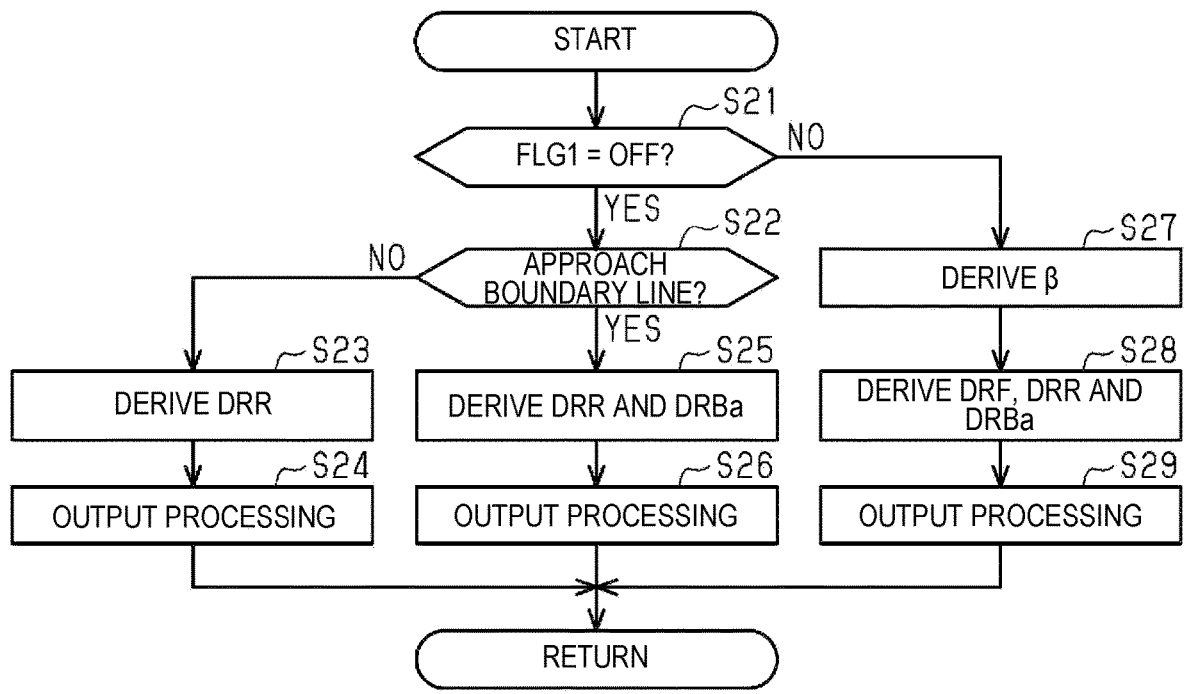
FIG. 3 is a flowchart illustrating a processing routine executed when turning support control is executed.

Next, a processing routine executed by the turning control unit 72 to execute the turning support control will be described with reference to FIG. 3. The present processing routine is repeatedly executed for each predetermined control cycle when execution conditions of the turning support control are satisfied. The execution conditions includes that the travel route TR is set and the execution of the vehicle control along the travel route TR is permitted.

In the present processing routine, in step S21, it is determined whether the steering override flag FLG1 is set to OFF. When the steering override flag FLG1 is set to OFF (S21: YES), it is determined that the steering is not being performed, and thus the steering-not-being-performed turning support control including steps S22 to S26 is executed. That is, in the steering-not-being-performed turning support control, in step S22, it is determined whether the vehicle is approaching a boundary line of the travel lane. The boundary line is a line located at a side end of the travel lane. Determination on whether the vehicle is approaching the boundary line can be performed by analyzing an image obtained by an imaging device that captures an image of an area in front of the vehicle. When the vehicle is approaching the boundary line, there is a concern that the vehicle may deviate from the travel lane.

When it is determined that the vehicle is not approaching the boundary line (S22: NO), the processing proceeds to a next step S23. In step S23, a control amount DRR of the rear wheel steered angle adjustment device 30 is derived based on a deviation between the target turning state quantity TSQTr derived by the target turning state quantity derivation unit 76 and the turning state quantity TSQ. Next, in step S24, output processing of outputting the control amount to each control unit is executed. In the output processing in this case, the control amount DRR derived in step S23 is output to the rear wheel steered control unit 36. Further, "0 (zero)" is output to the braking control unit 46 as a control amount DRBa of the braking device 40, and "0 (zero)" is output to the front wheel steered control unit 16 as a control amount DRF of the front wheel steered angle adjustment device 10. Then, the present processing routine is temporarily ended.

In this case, in the rear wheel steered angle adjustment device 30, the rear wheel steered actuator 31 is controlled based on the input control amount DRR. Therefore, the rear wheel steered angle θR becomes a steered angle corresponding to the control amount DRR. On the other hand, since the control amount DRBa input to the braking device 40 is "0 (zero)", the braking device 40 does not generate the braking force difference between the right front wheel FR and the left front wheel FL. Further, since the control amount DRF input to the front wheel steered angle adjustment device 10 is "0 (zero)", the front wheel steered angle adjustment device 10 maintains the front wheel steered angle θF at "0 (zero)". That is, while the rear wheel steered angle adjustment device 30 is driven, the front wheel steered angle adjustment device 10 and the braking control unit 46 are not driven.

On the other hand, when it is determined in step S22 that the vehicle is approaching the boundary line of the travel lane (YES), the processing proceeds to a next step S25. In step S25, the control amount DRR of the rear wheel steered angle adjustment device 30 and the control amount DRBa of the braking device 40 are derived based on the deviation between the target turning state quantity TSQTr derived by the target turning state quantity derivation unit 76 and the turning state quantity TSQ.

Here, a case where it is determined that the vehicle is approaching the boundary line even though it is determined that the vehicle is not approaching the boundary line at a start initial stage of the turning support control will be described as an example. In this case, when it is determined that the vehicle is not approaching the boundary line, a value corresponding to the deviation between the target turning state quantity TSQTr and the turning state quantity TSQ is set as the control amount DRR of the rear wheel steered angle adjustment device 30. Then, when a state in which it is determined that the vehicle is not approaching the boundary line is changed to a state in which it is determined that the vehicle is approaching the boundary line, the control amount DRR of the rear wheel steered angle adjustment device 30 is held at a value before the change. On the other hand, the control amount DRBa of the braking device 40 is derived based on the deviation between the target turning state quantity TSQTr and the turning state quantity TSQ. Accordingly, the control amount DRBa of the braking device 40 is set to a value that can correct a deviation between a center of the vehicle in a lateral direction and a center of the travel lane in the lateral direction.

When the control amounts DRR and DRBa are derived, the processing proceeds to a next step S26. In step S26, output processing of outputting the control amount to each control unit is executed. In the output processing in this case, the control amount DRR derived in step S25 is output to the rear wheel steered control unit 36, and the control amount DRBa is output to the braking control unit 46. Further, "0 (zero)" is output to the front wheel steered control unit 16 as the control amount DRF of the front wheel steered angle adjustment device 10. Then, the present processing routine is temporarily ended.

In this case, in the rear wheel steered angle adjustment device 30, the rear wheel steered actuator 31 is controlled based on the input control amount DRR. Therefore, the rear wheel steered angle θR becomes the steered angle corresponding to the control amount DRR. Further, in the braking device 40, the braking actuator 41 is controlled based on the input control amount DRBa. Therefore, a braking force difference corresponding to the control amount DRBa is generated between the right front wheel FR and the left front wheel FL. On the other hand, since the control amount DRF input to the front wheel steered angle adjustment device 10 is "0 (zero)", the front wheel steered angle adjustment device 10 maintains the front wheel steered angle θF at "0 (zero)". That is, while the rear wheel steered angle adjustment device 30 and the braking device 40 are driven, the front wheel steered angle adjustment device 10 is not driven.

On the other hand, in step S21, when the steering override flag FLG1 is set to ON (NO), it is determined that the steering is being performed, and thus the steering-being-performed turning support control including steps S27 to S29 is performed. That is, in the steering-being-performed turning support control, in step S27, a vehicle body slip angle β is derived. The vehicle body slip angle β can be derived based on, for example, the front wheel steered angle θF and the rear wheel steered angle θR. That is, the vehicle body slip angle β can be controlled by adjusting the front wheel steered angle θF and the rear wheel steered angle θR.

In a next step S28, the control amount DRF of the front wheel steered angle adjustment device 10, the control amount DRR of the rear wheel steering angle adjusting device 30, and the control amount DRBa of the braking device 40 are derived based on the target turning state quantity TSQTr derived by the target turning state quantity deriving unit 76, a deviation between the target vehicle body slip angle βTr and the vehicle body slip angle β, and the steering angle Str.

For example, a value corresponding to the steering angle Str is set as the control amount DRF of the front wheel steered angle adjustment device 10. Further, a value corresponding to the deviation between the target vehicle body slip angle βTr and the vehicle body slip angle β is set as the control amount DRR of the rear wheel steered angle adjustment device 30. A value corresponding to a deviation between a predicted value of the turning state quantity and the target turning state quantity TSQTr when the front wheel steered angle adjustment device 10 and the rear wheel steered angle adjustment device 30 are controlled based on the control amounts DRF and DRR is derived as the control amount DRBa of the braking device 40. Therefore, when the deviation between the predicted value of the turning state quantity and the target turning state quantity TSQTr is "0 (zero)", "0 (zero)" may be set as the control amount DRBa.

Then, in step S29, output processing of outputting the control amount to each control unit is executed. In the output processing in this case, the control amount DRF derived in step S28 is output to the front wheel steered control unit 16, the control amount DRR is output to the rear wheel steered control unit 36, and the control amount DRBa is output to the braking control unit 46. Then, the present processing routine is temporarily ended.

In this case, in the front wheel steered angle adjustment device 10, the front wheel steered actuator 11 is controlled based on the input control amount DRF. Therefore, the front wheel steered angle θF becomes a steered angle corresponding to the control amount DRF. Further, in the rear wheel steered angle adjustment device 30, the rear wheel steered actuator 31 is controlled based on the input control amount DRR. Therefore, the rear wheel steered angle θR becomes the steered angle corresponding to the control amount DRR. Further, in the braking device 40, the braking actuator 41 is controlled based on the input control amount DRBa. Therefore, a braking force difference corresponding to the control amount DRBa is generated between the right front wheel FR and the left front wheel FL. Accordingly, by driving the front wheel steered angle adjustment device 10, the rear wheel steered angle adjustment device 30, and the braking device 40, the turning state quantity TSQ can be caused to follow the target turning state quantity TSQTr, and the vehicle body slip angle β can be caused to follow the target vehicle body slip angle βTr.

Figure 4:
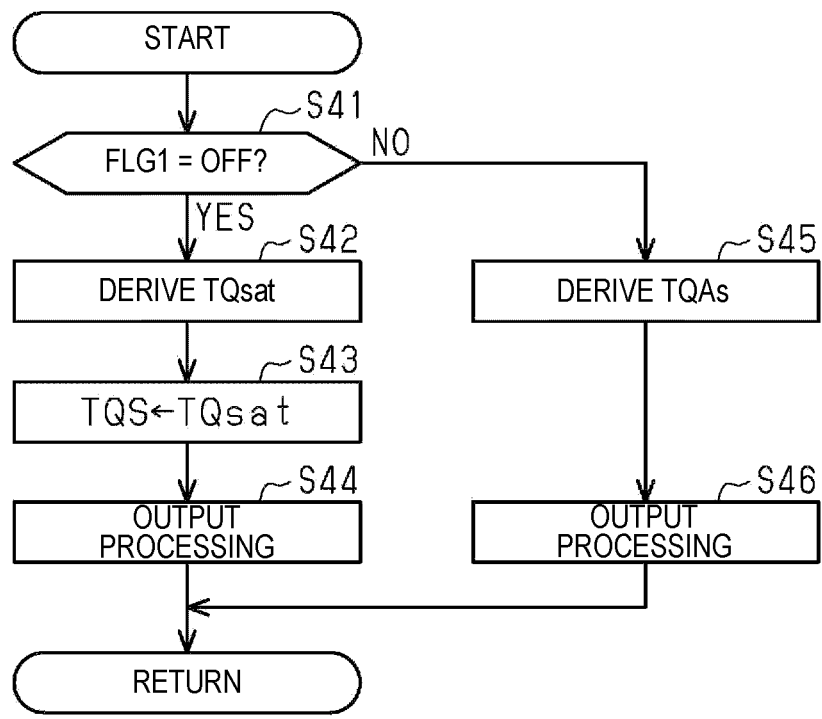
FIG. 4 is a flowchart illustrating a processing routine executed when a steering device is controlled.

Next, a processing routine executed by the steering instruction unit 73 to control the steering device 20 will be described with reference to FIG. 4. The present processing routine is executed at every predetermined control cycle when the turning support control is executed.

In the present processing routine, in step S41, it is determined whether the steering override flag FLG1 is set to OFF. When the steering override flag FLG1 is set to OFF (S41: YES), it is determined that the steering is not being performed, and thus the processing proceeds to a next step S42. In step S42, a self-aligning torque TQsat is derived based on a vehicle body speed VS, the yaw rate Yr, and the like of the vehicle.

Next, in step S42, the self-aligning torque TQsat is set as a reaction force suppression torque TQS. In a next step S43, output processing of outputting to the steering control unit 26 that the reaction force suppression torque TQS derived in step S42 is applied to the steering wheel 21 is executed. In the present embodiment, the reaction force suppression torque TQS derived in step S42 corresponds to the holding torque that is a torque for holding the steering angle Str at the neutral point StrC. That is, deriving the reaction force suppression torque TQS and outputting the reaction force suppression torque TQS to the steering control unit 26 correspond to instructing the steering device 20 to maintain the steering angle Str at the neutral point StrC. Thereafter, the present processing routine is temporarily ended.

In this case, in the steering device 20, the steering actuator 22 is controlled such that the input reaction force suppression torque TQS is applied to the steering wheel 21. Therefore, the steering angle Str is maintained at the neutral point StrC.

On the other hand, in step S41, when the steering override flag FLG1 is set to ON (NO), it is determined that the steering is being performed, and thus the processing proceeds to a next step S45. In step S45, an assist torque TQAs that is a torque for assisting the driver in steering is derived. That is, a value corresponding to the steering torque TQIn input to the steering wheel 21 is set as the assist torque TQAs. An absolute value of the assist torque TQAs increases as the absolute value of the steering torque TQIn increases. In a next step S46, output processing of outputting to the steering control unit 26 that the assist torque TQAs derived in step S45 is to be applied to the steering wheel 21 is executed. That is, deriving the assist torque TQAs and outputting the assist torque TQAs to the steering control unit 26 correspond to instructing the steering device 20 to assist the driver in steering. Thereafter, the present processing routine is temporarily ended.

In this case, in the steering device 20, the steering actuator 22 is controlled such that the input assist torque TQAs is applied to the steering wheel 21. Accordingly, the driver can be assisted in steering.

Next, functions and effects of the present embodiment will be described.

When the steering is not being performed during the execution of the turning support control, the front wheel steered angle θF is maintained at "0 (zero)". Therefore, when the reaction force suppression torque TQS corresponding to the holding torque is derived, it is necessary to derive a torque component corresponding to the vehicle body slip angle β, and it is not necessary to derive a torque component corresponding to the front wheel steered angle θF. Therefore, since it is not necessary to derive the torque component corresponding to the front wheel steered angle θF, the steering angle Str can be maintained at the neutral point StrC while reducing an increase in a calculation load of the travel control device 70.

Further, when the steering is not being performed during the execution of the turning support control, the braking device 40 is also driven when there is a possibility that the vehicle may deviate from the travel lane since only the rear wheel steered angle adjustment device 30 is driven. By driving the braking device 40 in addition to the rear wheel steered angle adjustment device 30 in this way, controllability when supporting automatic travelling of the vehicle along the travel lane can be improved.

When the steering is being performed during the execution of the turning support control, the front wheel steered angle θF is adjusted in accordance with the change in the steering angle Str by driving the front wheel steered angle adjustment device 10. Accordingly, unlike the case where the front wheel steered angle θF is maintained at "0 (zero)" even when the steering is being performed, calculation of the magnitude of the torque to be applied from the steering actuator 22 to the steering wheel 21 is less likely to be complicated.

Further, when the steering is being performed during the execution of the turning support control, the front wheel steered angle θF and the rear wheel steered angle θR are adjusted. Therefore, the vehicle body slip angle β can also be controlled in addition to the turning state quantity TSQ. Accordingly, controllability of a turning behavior of the vehicle during the turning of the vehicle can be enhanced.

When the steering is being performed during the execution of the turning support control, a case where a sum of a value before a start of the steering and the value corresponding to the steering angle Str is set as the target turning state quantity TSQTr is considered. In this case, when the steering is started, the target turning state quantity TSQTr may rapidly increase, and the magnitude of the yaw moment of the vehicle may rapidly increase. Then, the driver of the vehicle may feel uncomfortable for a sudden change in the magnitude of the yaw moment of the vehicle.

In contrast, in the present embodiment, when the steering is being performed during the execution of the turning support control, the target turning state quantity TSQTr is derived based on the parameter having the larger absolute value of the required turning state quantity TSQR and the target automatic turning state quantity TSQATr. Accordingly, the target turning state quantity TSQTr can be prevented from suddenly increasing at the start of the steering. That is, the magnitude of the yaw moment of the vehicle can be prevented from suddenly increasing due to the start of the steering. As a result, the driver is less likely to feel uncomfortable for the turning behavior of the vehicle at the start of the steering.

The above-described embodiment can be modified and implemented as follows. The above-described embodiment and the following modifications can be executed in combination with each other as long as the embodiment and the modifications do not have technical contradiction.

When the steering-being-performed turning support control is executed, as long as the target turning state quantity TSQTr is derived based on the parameter having the larger absolute value of the required turning state quantity TSQR and the target automatic turning state quantity TSQATr, the target turning state quantity TSQTr may be a value different from the parameter having the larger absolute. For example, a value obtained by adding a predetermined offset value to the parameter having the larger absolute value may be derived as the target turning state quantity TSQTr.

When the steering-being-performed turning support control is being executed, a sum of the target turning state quantity before the start of the steering and the value corresponding to the steering angle Str may be set as the target turning state quantity TSQTr.

When the braking device 40 is driven by executing the turning support control, the yaw moment may be generated in the vehicle by generating the braking force difference between the right rear wheel RR and the left rear wheel RL.

When the steering-not-being-performed turning support control is being executed, the rear wheel steered angle adjustment device 30 may be driven without driving the braking device 40. In this case, when it is determined that the steering is being performed, that is, when the steering-being-performed turning support control is being executed, the front wheel steered angle adjustment device 10 and the rear wheel steered angle adjustment device 30 may be driven, and the braking device 40 may not be driven.

When the steering-not-being-performed turning support control is being executed, the rear wheel steered angle adjustment device 30 may not be driven, and the braking device 40 may be driven. In this case, when it is determined that the steering is being performed, that is, when the steering-being-performed turning support control is being executed, the front wheel steered angle adjustment device 10 and the braking device 40 may be driven, and the rear wheel steered angle adjustment device 30 may not be driven. In this case, the travel control device can be applied to a vehicle that does not include the rear wheel steered angle adjustment device 30.

An example of the vehicle includes a vehicle including a drive motor dedicated to a right wheel and a drive motor dedicated to a left wheel. In this case, by driving the drive motor dedicated to the right wheel and driving the drive motor dedicated to the left wheel, a difference is generated between a driving torque input to the right wheel and a driving torque input to the left wheel, and a yaw moment corresponding to the difference can be generated in the vehicle. Therefore, when the travel control device 70 is applied to such a vehicle, a driving device including each drive motor and a control unit that controls each drive motor may be caused to function as the turning control device.

Next, technical ideas that can be understood from the above embodiment and modifications will be described.

(A) In the turning support control, when the steering is being performed, the turning control unit preferably derives the control amount of the front wheel steered angle adjustment device and the control amount of the rear wheel steered angle adjustment device based on the deviation between the target turning state quantity and the turning state quantity and the deviation between the vehicle body slip angle and the target slip angle that is the target of the vehicle body slip angle of the vehicle, outputs the control amount of the front wheel steered angle adjustment device to the front wheel steered angle adjustment device, and outputs the control amount of the rear wheel steered angle adjustment device to the rear wheel steered angle adjustment device.

The invention claimed is:

1. A travel control device for a vehicle to be applied to a vehicle including a front wheel steered angle adjustment device that is configured to control a turning state quantity, which is a state quantity related to turning of the vehicle, through adjustment of a steered angle of a front wheel, a turning control device that is provided separately from the front wheel steered angle adjustment device and configured to control the turning state quantity, and a steering device that includes a steering wheel to which a steering torque is input and is connected to the front wheel, the travel control device for a vehicle comprising:
   a turning control unit configured to execute turning support control of causing the turning state quantity to follow a target turning state quantity, which is a target of the turning state quantity, by causing at least one of the front wheel steered angle adjustment device and the turning control device to be driven; and
   a steering instruction unit configured to, when steering is not being performed during the execution of the turning support control, derive a holding torque, which is a torque at which a steering angle of the steering wheel is held at a neutral point, and instruct the steering device to apply the holding torque to the steering wheel, wherein
   the turning control unit is configured to cause the turning control device to be driven and cause the front wheel steered angle adjustment device not to be driven in the turning support control when the steering is not being performed, and cause the front wheel steered angle adjustment device to be driven in the turning support control when the steering is being performed.

2. The travel control device for a vehicle according to claim 1, wherein
   the vehicle includes, as the turning control device, a rear wheel steered angle adjustment device configured to adjust the turning state quantity through adjustment of a steered angle of a rear wheel of the vehicle, and
   the turning control unit is configured to cause the front wheel steered angle adjustment device and the rear wheel steered angle adjustment device to be driven in the turning support control when the steering is being performed.

3. The travel control device for a vehicle according to claim 2, wherein
   the vehicle includes, as the turning control device, a braking device configured to control the turning state quantity by adjusting a braking force difference between a right wheel and a left wheel of the vehicle, and
   the turning control unit is configured to cause at least one of the rear wheel steered angle adjustment device and the braking device to be driven and cause the front wheel steered angle adjustment device not to be driven in the turning support control when the steering is not being performed.

4. The travel control device for a vehicle according to claim 3 further comprising:
   a required turning state quantity setting unit configured to acquire a steering-related value related to the steering and set a value corresponding to the steering-related value as a required turning state quantity, which is a required value of the turning state quantity;
   a target automatic turning state quantity setting unit configured to set a target automatic turning state quantity that is a target of the turning state quantity for automatically turning the vehicle according to a set travel route; and
   a target turning state quantity derivation unit configured to derive the target turning state quantity based on a state quantity having a larger absolute value of the required turning state quantity and the target automatic turning state quantity.

5. The travel control device for a vehicle according to claim 2 further comprising:
   a required turning state quantity setting unit configured to acquire a steering-related value related to the steering and set a value corresponding to the steering-related value as a required turning state quantity, which is a required value of the turning state quantity;
   a target automatic turning state quantity setting unit configured to set a target automatic turning state quantity that is a target of the turning state quantity for automatically turning the vehicle according to a set travel route; and
   a target turning state quantity derivation unit configured to derive the target turning state quantity based on a state quantity having a larger absolute value of the required turning state quantity and the target automatic turning state quantity.

6. The travel control device for a vehicle according to claim 1 further comprising:
   a required turning state quantity setting unit configured to acquire a steering-related value related to the steering and set a value corresponding to the steering-related value as a required turning state quantity, which is a required value of the turning state quantity;
   a target automatic turning state quantity setting unit configured to set a target automatic turning state quantity that is a target of the turning state quantity for automatically turning the vehicle according to a set travel route; and
   a target turning state quantity derivation unit configured to derive the target turning state quantity based on a state quantity having a larger absolute value of the required turning state quantity and the target automatic turning state quantity.

* * * * *